Figure 1:
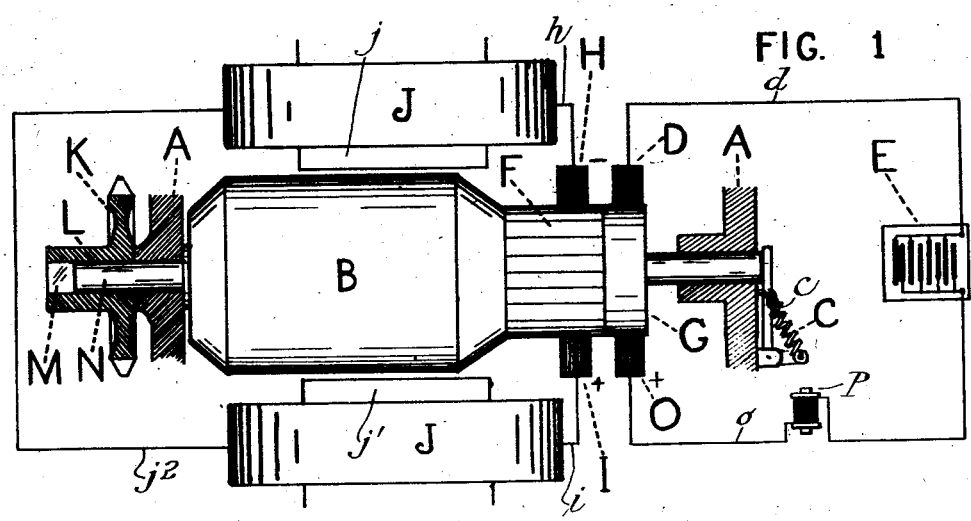

H. McQUILLIN.
DYNAMO ELECTRIC MACHINE.
APPLICATION FILED MAR. 13, 1914.

1,157,024.                    Patented Oct. 19, 1915.

Witnesses:
Stephen Rebora
R. H. Weir

Inventor
Howard McQuillin
By Jonee Bein May
Attys

UNITED STATES PATENT OFFICE.

HOWARD McQUILLIN, OF CHICAGO, ILLINOIS, ASSIGNOR OF ONE-HALF TO WILLIAM H. DUGGAN, OF CHICAGO, ILLINOIS.

DYNAMO-ELECTRIC MACHINE.

1,157,024.  Specification of Letters Patent. Patented Oct. 19, 1915.

Application filed March 13, 1914. Serial No. 824,421.

*To all whom it may concern:*

Be it known that I, HOWARD McQUILLIN, a citizen of the United States, residing at Chicago, in the county of Cook and State of Illinois, have invented certain new and useful Improvements in Dynamo-Electric Machines, of which the following is a specification.

My invention relates to improvements in dynamo electric machines.

One of the objects of my invention is to provide a dynamo electric machine, which automatically operates to switch a storage battery, or accumulator, into circuit therewith, after the rotatable member of such machine has attained a velocity sufficient to develop a predetermined electro-motive force.

Another object of my invention is to accomplish the above result in the simplest possible manner, by the elimination of all unnecessary attachments, usually employed for such purpose, such as relays, rheostats, automatic, centrifugal and magnetic switches, etc., by employing a moving part of the dynamo itself, capable of a resultant movement, in obedience to another energized portion of such machine to cut the battery into circuits with the dynamo at a predetermined critical time.

Other and further objects of my invention will become readily apparent, to persons skilled in the art, from a consideration of the following description when taken in conjunction with the drawing, wherein—

Figure 2:
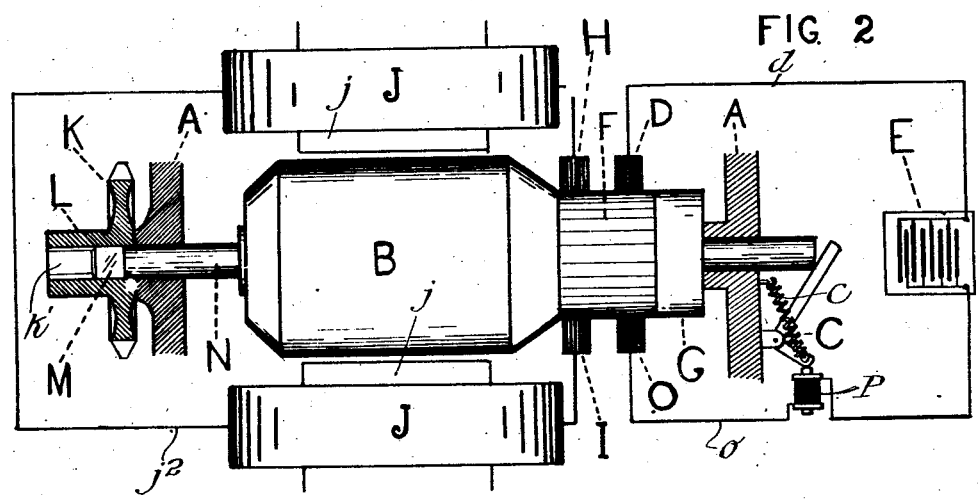

Figure 1 is a schematic view of the dynamo, assumed to be at rest, before the battery is admitted into circuit therewith and Fig. 2 is a similar view of the dynamo, after it has operated to cut the battery into circuit.

In all the views the same reference characters are employed to indicate similar parts.

In the exemplification I have shown the simplest form of shunt wound dynamo electric machine such as usually employed to produce constant potential, when driven at a constant speed, and which is best for charging storage batteries.

There are times when it is highly desirable for a storage battery, or accumulator, to be automatically brought into circuit with a dynamo electric machine for the purpose of charging the battery, without the necessity of the operator moving a special switch for this purpose and it is more highly important that the battery should be automatically cut out of circuit from the dynamo electric machine, after the speed of such machine has been decreased below a point where it no longer generates sufficient electro-motive force to send a current through the battery. This necessity exists in many environments, such for instance as a system for generating electricity for car lighting as when the dynamo electric machine is driven by the axle of the car or coach and in other instances, such for example as when the dynamo electric machine is to be driven by the engine employed to propel a vehicle such as an automobile or the like and which dynamo is intended to charge the storage battery. In such situations the integrity of memory of the operator cannot be relied upon to invariably perform the necessary switching functions, which, left unperformed would result disastrously to the battery, and to the dynamo with which it is connected.

In the drawing A represents the housing providing bearings for the shaft N of the armature B of the dynamo electric machine.

J and J' are the field coils for the dynamo electric machine, surrounding the polar projections *j—j'*.

The operative position of the armature B is centrally of the pole pieces *j—j'* as shown in Fig. 2 and this position is assumed when the pole pieces of the dynamo are energized, which operation will be hereinafter more specifically referred to.

The collecting brushes H and I continuously bear upon the commutator F. The end portion G of the commutator, is preferably made of insulating material and is unusually wide; its peripheral surface being in substantially the same plane as the peripheral active surface of the commutator F, as shown in the drawings. Brushes D and O bear upon the insulating surface G, in Fig. 1, being connected to the accumulator E by wires *d* and *o*.

A driving pulley K, in this particular instance, is shown to be a sprocket wheel, adapted for driving association with a properly formed chain, is rotatably connected to the shaft N, by a squared portion of the pulley bore making contact with the squared portion M on the extreme end of the shaft. In Fig. 2 the squared portion M of the shaft is shown drawn into the interior of the pulley and the round portion of the shaft N is within the bearing provided in the housing A, so that in each instance, Fig. 1 and Fig. 2, the squared portion M effects driving association between the pulley K and the shaft N.

When the pole pieces *j—j'* of the dynamo electric machine are properly energized the armature B is moved, by the magnetic attraction thereof for the armature, axially upon its shaft, from the position shown in Fig. 1 to the position shown in Fig. 2 against the operation of a spring *c* which operates upon the lever C to yieldingly push the shaft, against the operation of the energized field, into the position shown in Fig. 1 when the field is deënergized.

An electromagnet P is included in circuit in the wire *o* and is energized when the battery circuit is closed over the wires *d* and *o*. After the armature has been moved from the position shown in Fig. 1, to the position shown in Fig. 2, the short end of the lever C will be brought into contact with the pole of the electro-magnet P and will be held in this position so long as the battery circuit in which the electro-magnet is included is closed by the brushes D and O bearing upon the active portion of the commutator F.

The operation of the device is as follows: As shown in Fig. 1 the circuit over the wires *d* and *o* from the dynamo to the battery E, is open because the brushes D and O bear upon an insulating cylinder G of the commutator. Now when the armature B, of the dynamo, is properly rotated, by suitable driving means, as through its pulley K, current will pass from the brush I, which is assumed to be the positive terminal of the dynamo, through the wire *i* into the field magnet winding J' through the wire $j^2$ to the winding J and through the winding by the wire *h* to the negative brush H, thereby completing the circuit through the field winding and energizing the field magnets by the current produced by the armature, due to the residuary magnetism existing in the field poles *j—j'*. When these poles become sufficiently strong, by the accumulation of current thus produced, the armature will be axially moved from the position shown in Fig. 1 to the position shown in Fig. 2 and this movement of the armature will occur at a critical point and will be influenced, to a greater or less extent, by the resistance imposed by the spring *c* bearing against the end of the shaft N, so that the variation of the strength of the spring C will influence, to some extent, the critical time at which the armature will be so moved. When the armature is thus moved axially, the insulating portion G of the commutator will have passed out from under the brushes D and O which are connected to the battery E and the active portion of the commutator F will have passed under the brushes D and O, thus putting the battery E into electrical communication with the commutator F of the armature B, after the armature has developed a predetermined electro-motive force which is sufficient to cause its axial movement by the magnetically energized effect of the field magnets J, J'.

When the armature has moved into the position shown in Fig. 2, the lever C is thereby placed at an angle, so that the pressure produced by the spring *c*, although the spring at this time is very much stronger, is not so effective to push the armature back into its former position against the effect of the field's magnetism as when the lever is in position shown in Fig. 1, because the pressure exerted by the lever C upon the end of the shaft, instead of being in an axial line, or plane with the shaft, is at an angle thereto and therefore its effect to axially displace the shaft is not so great with a given strength of the spring, as when it is in position shown in Fig. 1. When the small end of the lever C however, is placed in the position shown in Fig. 2, by the displacement of the armature from its normal position, the small end of the lever makes contact with the pole end of the electro-magnet P which tends to hold the lever C in the position in which it has been placed, as in Fig. 2, and thus the armature is relieved, to some extent, of the stress that would be otherwise applied to it by the spring *c* so that slight variations of the speed of the armature will not operate to cause its axial displacement, as the lever C will be held by the magnet P during the time that the storage battery E is energized by the armature.

Instead of using a sprocket wheel K to drive the armature, as shown, a shrouded gear, a flanged pulley for a belt, or other means for normally retaining the driving wheel in the plane in which it is shown to prevent its axial movement on the shaft may be employed for the purpose.

Now if the power, used to rotate the armature B be withdrawn, the electro-motive force produced by the armature will be decreased and the field magnets will have lost their power, to some extent, and at this critical time, before the battery E has been turned into the field magnet windings *j—j'* to energize them, as before, the armature B will have been moved axially from the position shown in Fig. 2 to the position shown in Fig. 1 thereby opening the circuit between the brushes D and O and effectively removing the battery from the dynamo connection.

While I have herein shown a single embodiment of my invention, for the purpose of clear disclosure, it is evident that changes may be made in unessential details without departure from the scope of the appended claims.

Having described my invention, what I claim is:—

1. A dynamo electric machine having field windings, an armature and an axially movable commutator; an insulated extension of the commutator; line brushes normally bearing on said extension, field excitation brushes connected to the field windings and normally bearing on the commutator and means, operable by the rotation of the armature, to shift the active portion of the commutator to position under said line brushes.

2. A dynamo electric machine having a field magnet and winding, an axially movable armature and commutator and an insulated extension of the commutator, in combination with brushes normally bearing on said extension; brushes bearing on the active portion of said commutator, to energize the field magnet winding, whereby the armature is laterally moved on its axis to shift the active portion of the commutator under just mentioned brushes when the armature is rotated and the field magnet energized thereby.

3. A shunt wound dynamo electric machine having field windings, an axially movable commutator, and an insulated commutator extension; in combination with a set of collecting brushes, normally bearing on said extension and another set of collecting brushes bearing on the active portion of the commutator, the latter being connected to the field windings, whereby to move an active part of said commutator under the first pair of brushes by the axial movement of the armature when the field windings are energized by rotation thereof.

4. A dynamo electric machine having an axially movable armature and commutator and two sets of collecting brushes; means for supporting one set of brushes out of contact with the commutator; a storage battery; a circuit connecting said battery to the latter set of brushes; a circuit connecting the other set of brushes to the field windings of the dynamo, whereby to energize the field magnet when the armature is rotated thereby to slidably move the armature thereunder and simultaneously move the commutator under the battery circuit brushes to connect them to the battery to close circuit between the armature and battery; means to oppose the axial movement of the armature, and means, energized by the battery circuit to disable said opposing means.

5. A dynamo electric machine having an axially movable armature, movable in response to energization of its field magnets; yielding means of variable resistance to return said armature to normal position when the fields are deënergized the resistance of the yielding means being smallest when the armature is at the end of its magnetically actuated movement and means for changing the dynamo circuits, effected by movement of said armature.

6. A dynamo electric machine having field windings, an armature and an axially movable commutator; an insulated extension of the commutator; line brushes normally bearing on said extension; field excitation brushes connected to the field winding and normally bearing on the commutator; means operable by the rotation of the armature to shift the active portion of the commutator to position under said line brushes; and a yieldable means opposing the shifting of the active portion of the commutator to position under the line brushes.

7. In combination a dynamo electric machine having an axially movable commutator; an insulated extension of the commutator; line brushes normally bearing on said extension; field excitation brushes normally bearing on the commutator; means operable by the rotation of the armature to shift the active portion of the commutator to position under the line brushes; a consuming device; a circuit connecting said consuming device to the line brushes; means to oppose the axial movements of the armature; and means energized by the said circuit to disable the opposing means.

In testimony whereof I hereunto set my hand in the presence of two subscribing witnesses.

HOWARD McQUILLIN.

In the presence of—
FORÉE BAIN,
MARY F. ALLEN.